United States Patent
Seo et al.

(10) Patent No.: US 9,921,443 B2
(45) Date of Patent: Mar. 20, 2018

(54) DISPLAY DEVICE INCLUDING SHORTING BAR

(71) Applicant: Samsung Display Co., Ltd., Yongin, Gyeonggi-Do (KR)

(72) Inventors: Joo Hong Seo, Hwaseong-si (KR); Tae Hee Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 174 days.

(21) Appl. No.: 14/683,295

(22) Filed: Apr. 10, 2015

(65) Prior Publication Data
US 2016/0109770 A1   Apr. 21, 2016

(30) Foreign Application Priority Data

Oct. 20, 2014 (KR) .......................... 10-2014-0141802

(51) Int. Cl.
*G02F 1/1362* (2006.01)
*G02F 1/1345* (2006.01)

(52) U.S. Cl.
CPC .... *G02F 1/136204* (2013.01); *G02F 1/13452* (2013.01); *G02F 2001/136254* (2013.01)

(58) Field of Classification Search
CPC ............. G02F 1/136204; G02F 1/1368; G02F 1/13452; G02F 2001/136254
See application file for complete search history.

(56) References Cited

U.S. PATENT DOCUMENTS

| 6,025,891 | A | 2/2000 | Kim | |
| 6,927,420 | B2* | 8/2005 | Kim | G02F 1/136204 257/173 |
| 7,379,127 | B2 | 5/2008 | Tsao | |
| 8,054,440 | B2 | 11/2011 | Youn et al. | |
| 8,637,867 | B2* | 1/2014 | Choi | H01L 27/0296 257/59 |
| 2005/0140836 | A1* | 6/2005 | Choi | G02F 1/136204 349/40 |
| 2008/0074137 | A1 | 3/2008 | Kim et al. | |
| 2015/0199929 | A1* | 7/2015 | Kim | G09G 3/006 324/762.01 |

FOREIGN PATENT DOCUMENTS

| JP | 08-271923 A | 10/1996 |
| JP | 2000-098425 A | 4/2000 |
| JP | 2000-098426 A | 4/2000 |

(Continued)

*Primary Examiner* — Dung Nguyen
(74) *Attorney, Agent, or Firm* — Cantor Colburn LLP

(57) ABSTRACT

A display device includes a substrate including an array area in which an image is displayed and a pad area in which an image is not displayed, gate lines in the array area and elongated in a first direction on the substrate, gate lines pads in the pad area and respectively electrically connected to the gate lines, floating patterns disposed in the pad area, a first shorting bar in the pad area and with which electrostatic energy from the floating patterns is dissipated; and first shorting bar lines in the pad area and defined by first lines respectively connected to the floating patterns and second lines spaced apart from the first lines and connected to the first shorting bar, wherein ends of the second lines respectively face ends of the first lines.

14 Claims, 13 Drawing Sheets

(56) References Cited

FOREIGN PATENT DOCUMENTS

| KR | 10-0244184 B1 | 11/1999 |
| --- | --- | --- |
| KR | 10-0580389 B1 | 5/2006 |
| KR | 1020060077937 A | 7/2006 |
| KR | 1020080008569 A | 1/2008 |
| KR | 10-0941314 B1 | 2/2012 |
| KR | 10-1157973 B1 | 6/2012 |

* cited by examiner

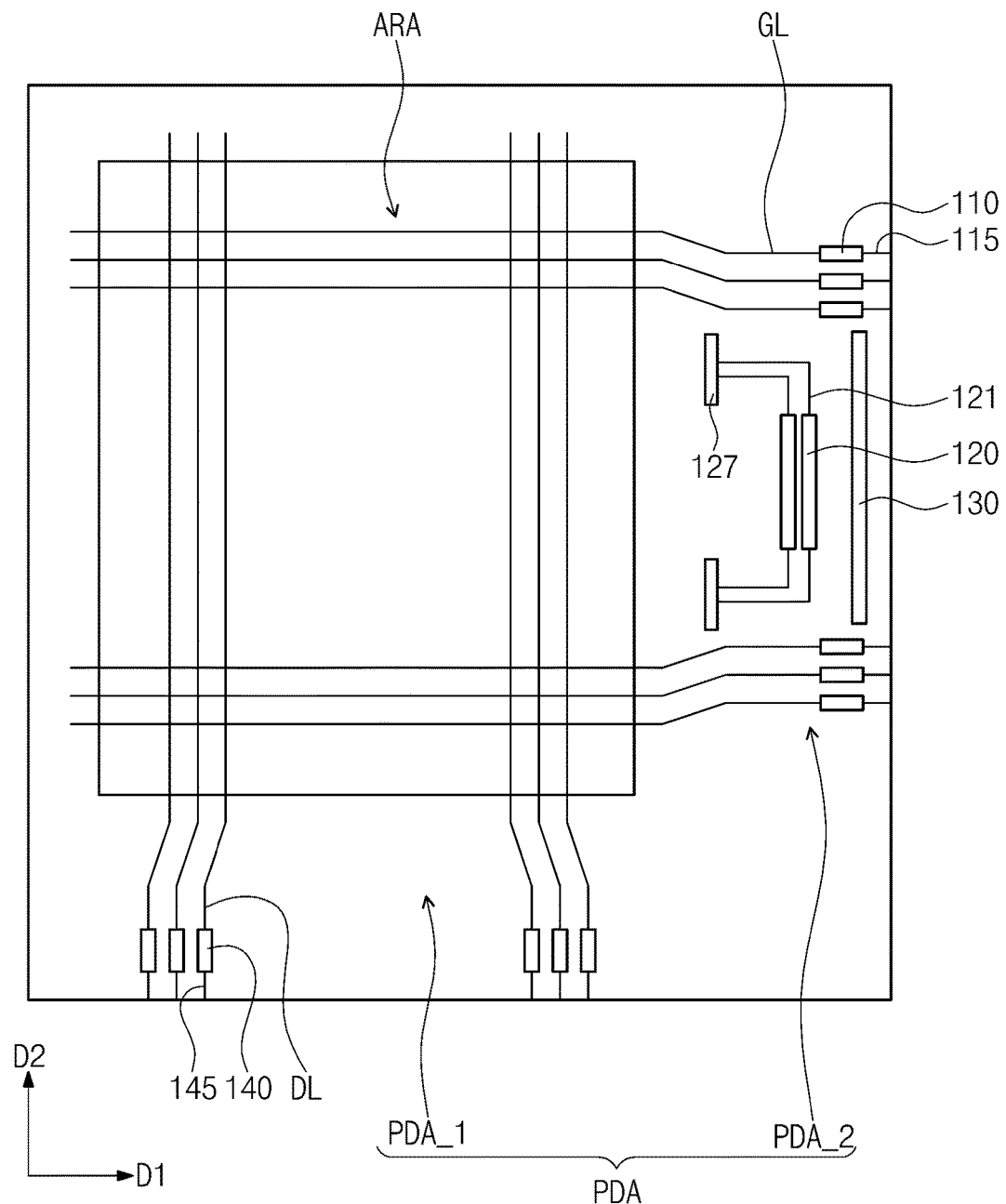

DISPLAY DEVICE INCLUDING SHORTING BAR

This application claims priority to Korean Patent Application No. 10-2014-0141802, filed on Oct. 20, 2014, and all the benefits under 35 U.S.C. § 119, the contents of which are hereby incorporated by reference in its entirety.

BACKGROUND

1. Field

The invention relates to a display device. More particularly, the invention relates to a liquid crystal display.

2. Description of the Related Art

In general, a liquid crystal display includes a first display substrate including signal lines such as gate lines and data lines, thin film transistors respectively disposed in pixel areas and pixel electrodes respectively disposed in the pixel areas, a second display substrate including a color filter and a common electrode, and a liquid crystal layer interposed between the first and second display substrates. The liquid crystal display applies voltages to the pixel electrode and the common electrodes to realign liquid crystal molecules of the liquid crystal layer, and thus an amount of light traveling through the liquid crystal layer is adjusted, thereby displaying desired images.

To manufacture the liquid crystal display, various processes, e.g., a process of forming various patterns including transistors on the first display substrate, a process of forming various patterns including the color filter layer on the second display substrate, a process of injecting a liquid crystal material into between the first and second display substrates, which are coupled with each other, and a process of connecting an external driving circuit to the first display substrate, are required.

SUMMARY

When a liquid crystal display is manufactured, an inspection process is performed to inspect for defects in signal lines, e.g., an electrical short between the signal lines or an open in the signal lines, and for defects in thin film transistors connected to respective signal lines. For the inspection process, a shorting bar is connected to each signal line on the first display substrate. However, forming the shorting bar may be difficult in the liquid crystal display when the liquid crystal display employs a portrait-type orientation display panel in which an overall length thereof in a vertical direction is greater than an overall length thereof in a horizontal direction to reduce manufacturing cost and power consumption.

One or more exemplary embodiment of the invention provides a display device including a shorting bar applicable to various structures of a display device.

One or more exemplary embodiment of the invention provides a display device including a substrate including an array area in which an image is displayed and a pad area in which an image is not displayed, gate lines in the array area and elongated in a first direction on the substrate, gate lines pads in the pad area and respectively electrically connected to the gate lines, floating patterns in the pad area, a first shorting bar in the pad area and with which electrostatic energy from the floating patterns is dissipated, and first shorting bar lines in the pad area and defined by first lines respectively connected to the floating patterns and second lines spaced apart from the first lines and connected to the first shorting bar, where ends of the second lines face ends of the first lines.

The first lines may include first ends respectively connected to the floating patterns and second ends opposite to the first ends, the second ends of the first lines facing the ends of the second lines. The second ends of the first lines may be aligned in a plan view.

The second lines may include first ends respectively connected to the first shorting bar and second ends opposite to the first ends, the second ends of the second lines facing the second ends of the first lines. The second ends of the second lines may be aligned in the plan view.

The first lines of the first shorting bar lines may have a bent structure or the second lines of the first shorting bar lines may have a bent structure.

In the first direction, the first shorting bar may be disposed between the array area and the floating patterns.

The display device may further include an outermost line in the pad area.

In the first direction, the floating patterns may be disposed between the first shorting bar and the outermost line.

In the first direction, the first shorting bar may be disposed between the outermost line and the floating patterns.

The display device may further include second shorting bar lines in the pad area and respectively connected to the gate line pads.

Distal ends of the second shorting bar lines may each terminate at an outermost edge of the substrate.

The display device may further include a second shorting bar in the pad area. The second shorting bar lines may be disposed between the second shorting bar and the gate line pads. Each of the second shorting bar lines may be defined by a first portion connected to a respective gate line pad and a second portion spaced apart from the first portion, wherein the second portion is connected to the second shorting bar. Among the second shorting bar lines disposed between the second shorting bar and the gate line pads, ends of the second portions may respectively face ends of the first portions.

The display device may further include data lines in the array area and elongated in a second direction substantially perpendicular to the first direction on the substrate, data line pads in the pad area and respectively electrically connected to the data lines, and second shorting bar lines in the pad area and respectively connected to the data line pads.

Distal ends of the second shorting bar lines may each terminate at an outermost edge of the substrate.

The display device may further include a second shorting bar in the pad area. The second shorting bar lines may be disposed between the second shorting bar and the data line pads. Each of the second shorting bar lines may be defined by a first portion connected to a respective data line pad and a second portion spaced apart from the first portion and connected to the second shorting bar. Among the second shorting bar lines disposed between the second shorting bar and the data line pads, ends of the second portions may respectively face ends of the first portions.

According to one or more exemplary embodiment described above, in a preliminary display substrate, the first shorting bar is electrically connected to the floating patterns by the first shorting bar lines, and thus the static electricity generated in the floating patterns may be discharged. In a display substrate formed from the preliminary display substrate, since the first shorting bar lines are divided to define disconnected portions thereof, the floating patterns may be separated from the first shorting bar.

BRIEF DESCRIPTION OF THE DRAWINGS

The above and other advantages of the disclosure will become readily apparent by reference to the following detailed description when considered in conjunction with the accompanying drawings wherein:

FIGS. 4A through 4C are plan views showing an exemplary embodiment of a manufacturing method of a display device according to the invention;

DETAILED DESCRIPTION

Figure 1:
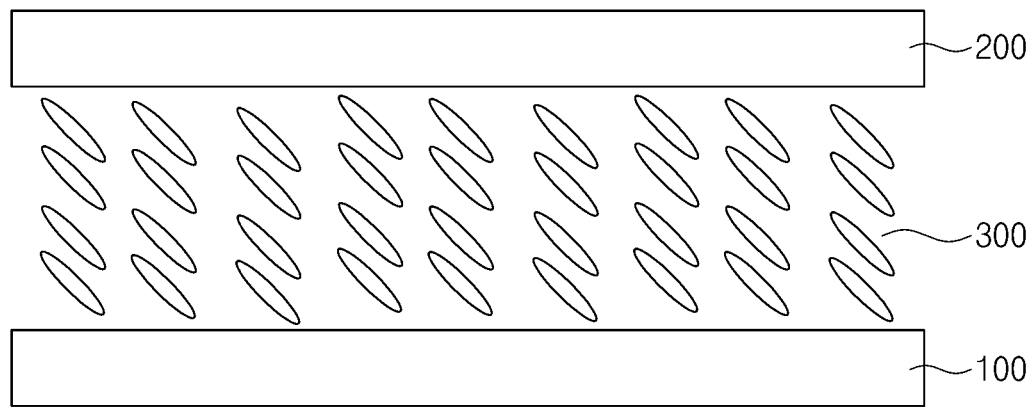
FIG. 1 is a cross-sectional view showing an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. In the drawings, while a reference numeral may be illustrated with respect to a single feature, the reference numeral is used to indicate not only a singular feature but also to collectively indicate a plurality of the feature. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2A:
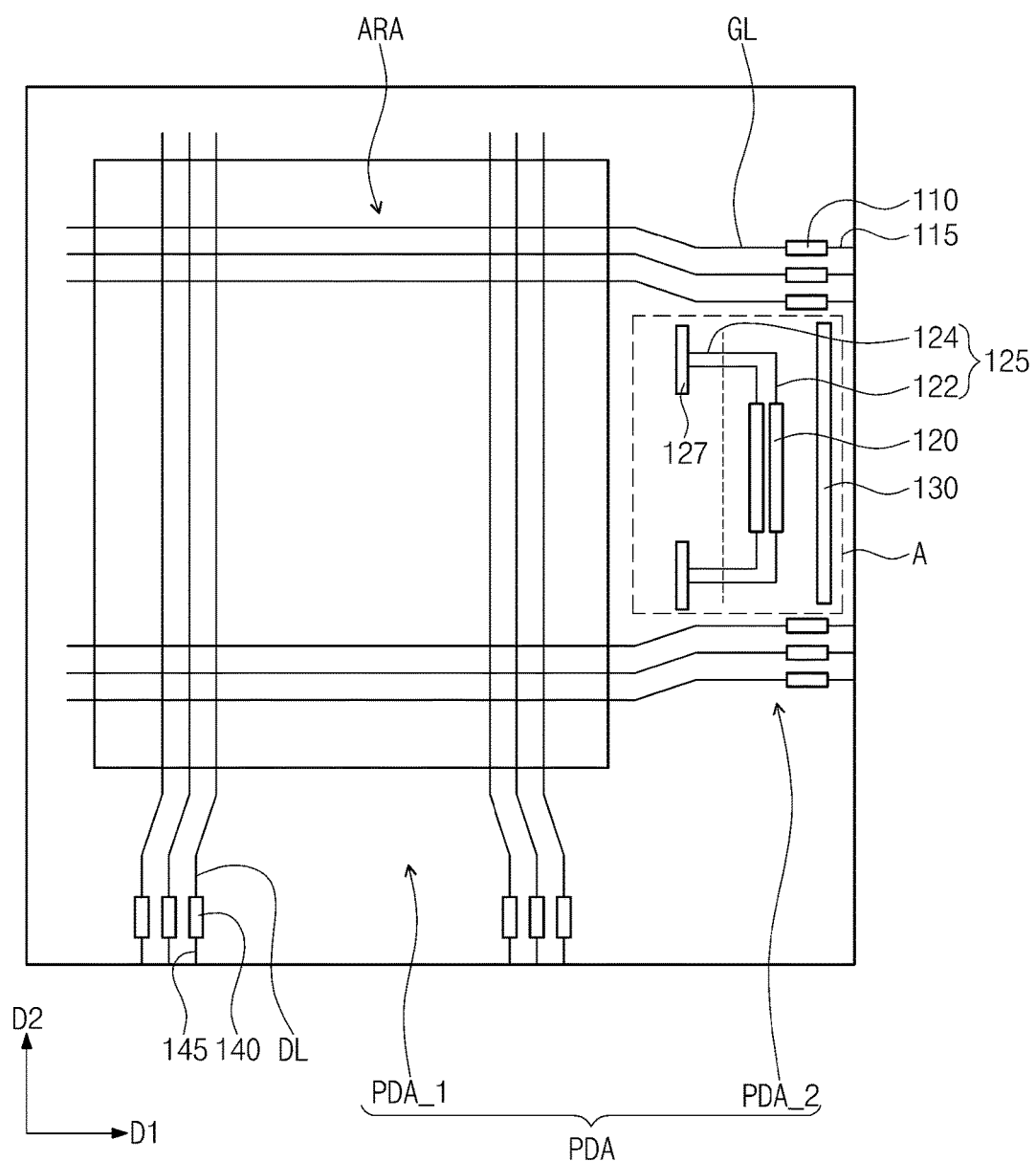
FIG. 2A is a plan view showing an exemplary embodiment of a first display substrate of a display device according to the invention.
Figure 2B:
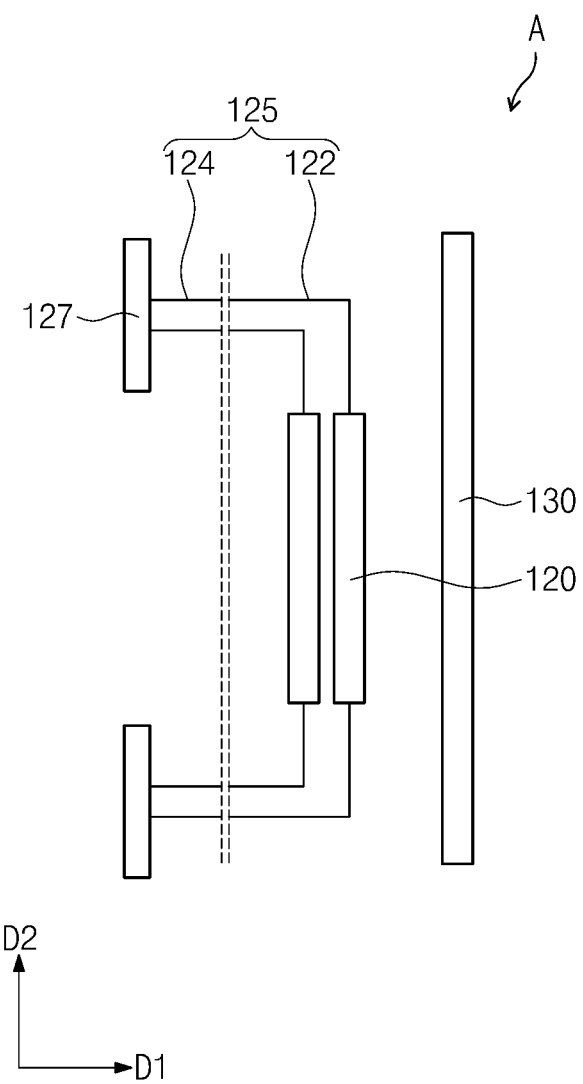
FIG. 2B is a partially enlarged view showing portion A shown in FIG. 2A.
Figure 3A:
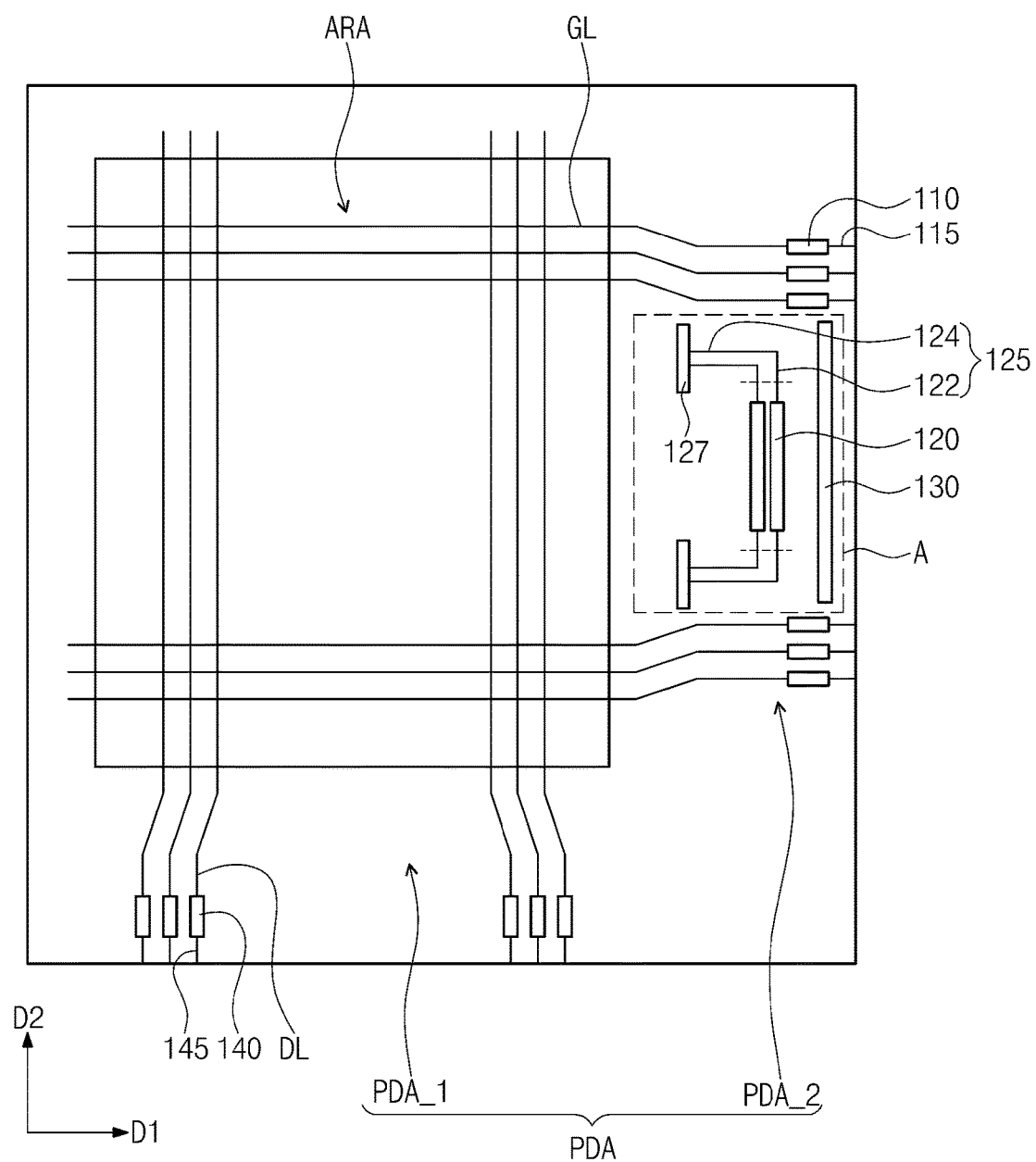
FIG. 3A is a plan view showing another exemplary embodiment of a first display substrate of a display device according to the invention.
Figure 3B:
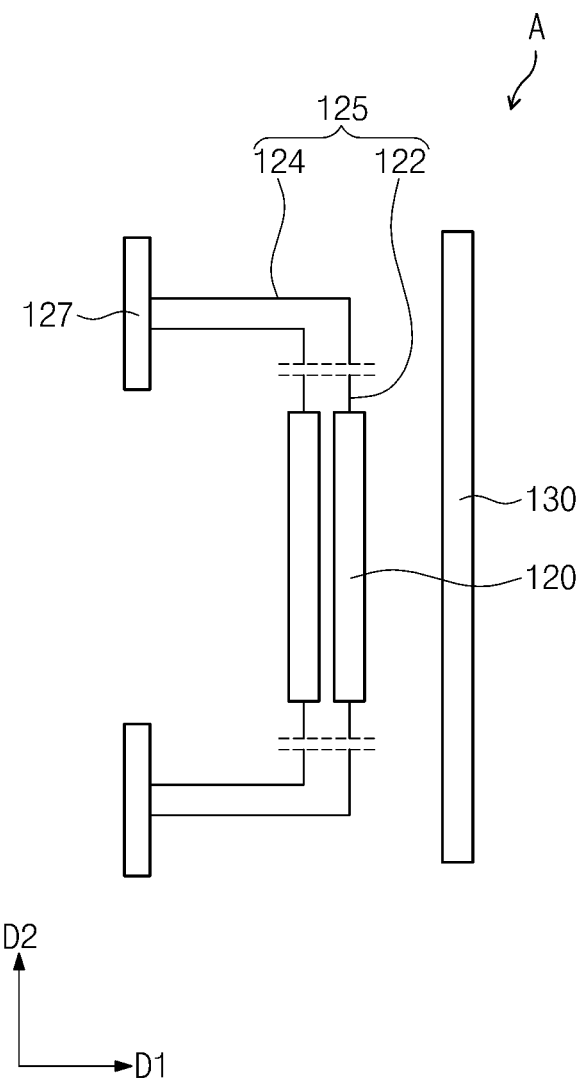
FIG. 3B is a partially enlarged view showing portion A shown in FIG. 3A.

FIG. 1 is a cross-sectional view showing an exemplary embodiment of a display device according to the invention, FIG. 2A is a plan view showing an exemplary embodiment of a first display substrate of a display device according to the invention, FIG. 2B is a partially enlarged view showing portion A shown in FIG. 2A, FIG. 3A is a plan view showing another exemplary embodiment of a first display substrate of a display device according to the invention, and FIG. 3B is a partially enlarged view showing portion A shown in FIG. 3A.

Referring to FIGS. 1, 2A and 3A, the display device includes a first display substrate 100, a second display substrate 200 spaced apart from the first display substrate 100 and facing the first display substrate 100, and a liquid crystal layer 300 interposed between the first and second display substrates 100 and 200.

In the illustrated exemplary embodiment, in the plan view, the first display substrate 100 has a substantially rectangular shape and is provided in a portrait type orientation in which an overall length thereof in a vertical direction is greater than an overall length thereof in a horizontal direction. Hereinafter, the horizontal direction of the first display substrate 100 is referred to as a first direction D1 and the vertical direction is referred to as a second direction D2 substantially vertical to the first direction D1.

The first display substrate 100 includes an array area ARA and a pad area PDA. In an exemplary embodiment, an image of the display device may be display in the array area ARA, while an image is not displayed in the pad area PDA, but the invention is not limited thereto. The array area ARA and the pad area PDA may otherwise be generally referred to as a display area and a non-display area.

In an exemplary embodiment, the array area ARA covers a center portion of the first display substrate 100 and is shifted to one side portion of the first display substrate 100. The pad area PDA is outside of and surrounds at least a portion of the array area ARA. Referring to FIG. 2A, for instance, the overall pad area PDA includes a first area PDA_1 disposed at a lower side of the array area ARA and a second area PDA_2 disposed at a right side of the array area ARA. In other words, the first area PDA_1 of the pad area PDA extends in the second direction D2 from the array area ARA and the second area PDA_2 extends in the first direction D1 from the array area ARA. The overall pad area PDA may further include areas disposed at a left side and an upper side of the array area ARA, but the invention is not limited thereto.

The first display substrate 100 includes gate lines GL elongated to extend in the first direction D1 and data lines DL elongated to extend in the second direction D2 on a base substrate. The gate lines GL and the data lines DL cross within the array area ARA and each extend to the pad area PDA. Distal ends of the gate lines GL and the data lines DL may be disposed in the pad area PDA, but the invention is not limited thereto.

Although not shown in detail, the first display substrate 100 further includes thin film transistors and pixel electrodes on the base substrate. Each thin film transistor among the thin film transistors is electrically connected to a corresponding gate line among the gate lines GL and a corresponding data line among the data lines DL and switches a signal applied to a corresponding pixel electrode among the pixel electrodes. Each thin film transistor includes a gate electrode branched from the corresponding gate line, a source electrode branched from the corresponding data line, and a drain electrode electrically connected to the corresponding pixel electrode. In addition, each thin film transistor further includes an active pattern disposed between the source electrode and the drain electrode in a plan view. A portion of the active pattern may be exposed between the source electrode and the drain electrode which are spaced apart from each other. Each thin film transistor further includes a gate insulating pattern disposed between the active pattern and the gate electrode in a cross-sectional view.

Referring to FIGS. 2A, 2B, 3A and 3B, gate line pads 110 electrically connected to the gate lines GL, first shorting bar lines 115, floating patterns 120, second shorting bar lines 125, a second shorting bar 127 and an outermost line 130 are each disposed on the base substrate and in the pad area PDA.

First ends of the gate line pads 110 make contact with distal ends of the gate lines GL and the second ends of the gate line pads 110 opposite to the first ends thereof make contact with the first shorting bar lines 115. First ends of the first shorting bar lines 115 make contact with the gate line pads 110 and the second (distal) ends of the first shorting bar lines 115 opposite to the first ends thereof terminate to make contact with or be aligned with an edge of the first display substrate 100.

The outermost line 130 is disposed on the base substrate at the edge of the first display substrate 100 to be adjacent to the floating patterns 120. The floating patterns 120 are electrically disconnected from other elements of the first display substrate 100 to be considered as electrically floating.

According to the illustrated exemplary embodiment, the floating patterns 120 are disposed between the outermost line 130 and the array area ARA. The floating patterns 120 are not electrically connected to the gate lines GL and are electrically connected between circuit lines (not shown). Each of the floating patterns 120 has a bar shape elongated to extend in the second direction D2.

Each of the second shorting bar lines 125 includes a first line 122 connected to a corresponding floating pattern 120 among the floating patterns 120 and a second line 124 connected to the second shorting bar 127. In more detail, a first end of the first line 122 is connected to the corresponding floating pattern 120 and a first end of the second line 124 is connected to the second shorting bar 127. A second end of the first line 122 opposite to the first end thereof faces a second end of the second line 124 opposite to the first end thereof, and has a structure corresponding to that of the second line 124. That is, cross-sectional layered structure of the first and second lines 122 and 124 may be the same, such as including same materials or being disposed in same layers of the first display substrate 100 among layers disposed on the base substrate thereof. Among the first lines 122, the second (distal) ends of the first lines 122 are disposed at or aligned with a same plane (e.g., coplanar) and among the second lines 124, the second ends of the second lines 124 are disposed to terminate at or be aligned with a same plane (e.g., coplanar).

Referring to FIGS. 2A and 2B, each of the first lines 122 of the second shorting bar lines 125 is bent in the plan view. In the illustrated exemplary embodiment, for instance, each of the first lines 122 includes a first portion elongated to extend in the second direction D2 and a second portion elongated to extend in the first direction D1. The second line 124 is elongated to extend in the first direction D1 without being bent. An entirety of the second line 124 is elongated in the first direction D1. Although not shown in figures, a third line may be further disposed between the first and second lines 122 and 124.

Referring to FIGS. 3A and 3B, each of the first lines 122 of the second shorting bar lines 125 is elongated to extend in the second direction D2 without being bent. An entirety of the first line 122 is elongated in the second direction D2. Each of the second lines 124 of the second shorting bar lines 125 is bent in the plan view. In the illustrated exemplary embodiment, for instance, each of the second lines 124 includes a first portion elongated to extend in the second direction D2 and a second portion elongated to extend in the first direction D1. Although not shown in figures, a third portion (not shown) may be further disposed between the first and second portions.

The outermost line 130 is disposed between the floating patterns 120 and the edge of the first display substrate 100. The second shorting bar 127, which is configured to reduce or effectively prevent static electricity (e.g., electrostatic energy) from being generated in the floating pattern 120, is disposed between the floating pattern 120 and the array area ARA. The static electricity may be generated during an inspection process and/or a manufacturing process of the display device. Accordingly, after an inspection and/or manufacturing process of the display device, the second shorting bar 127 is not removed and remains a part of the first display substrate 100.

When the first and second lines 122 and 124 are electrically connected to each other, the second shorting bar 127 is connected to the floating pattern 120 via the first and second lines 122 and 124 electrically connected to each other. When the static electricity is generated in the floating pattern 120, the second shorting bar 127 is in an equipotential state with the floating pattern 120 via the first and second lines 122 and 124 electrically connected to each other, and thus the static electricity generated in the floating patterns 120 is discharged. The static electricity may be generated during an inspection process and/or a manufacturing process of the display device. Then, after an inspection and/or manufacturing process of the display device, the first and second lines 122 and 124 are electrically separated (e.g., disconnected) from each other such that the second shorting bar 127 is electrically separated from the floating pattern 120.

Referring to FIGS. 2A and 3A again, data line pads 140 and third shorting bar lines 145, which are electrically connected to the data lines DL, are each disposed on the base substrate and in the first area PDA_1 of the pad area PDA.

First ends of the data line pads 140 are connected to distal ends of the data lines DL and the second ends of the data line pads 140 opposite to the first ends thereof are connected to the third shorting bar lines 145. First ends of the third shorting bar lines 145 are connected to the second ends of the data line pads 140 and second ends of the third shorting bar lines 145 opposite to the first ends thereof are disposed at the edge of the first display substrate 100. The second (distal) ends of the third shorting bar lines 145 opposite to the first ends may terminate to make contact with or be aligned with an edge of the base substrate of the first display substrate 100.

Although not shown in figures, the second display substrate 200 includes a common electrode and a color filter each disposed on a base substrate. In addition, a column spacer is disposed between the first and second display substrates 100 and 200 to allow the first and second display substrates 100 and 200 to be spaced apart from each other, and the liquid crystal layer 300 is disposed between the spaced apart first and second display substrates 100 and 200. The liquid crystal display applies voltages to the pixel electrode and the common electrodes to realign liquid crystal molecules of the liquid crystal layer 300, and thus an amount of light traveling through the liquid crystal layer is adjusted 300, thereby displaying desired images in a display area of the liquid crystal display.

Hereinafter, a manufacturing method of a display device will be described in detail.

Figure 4A:
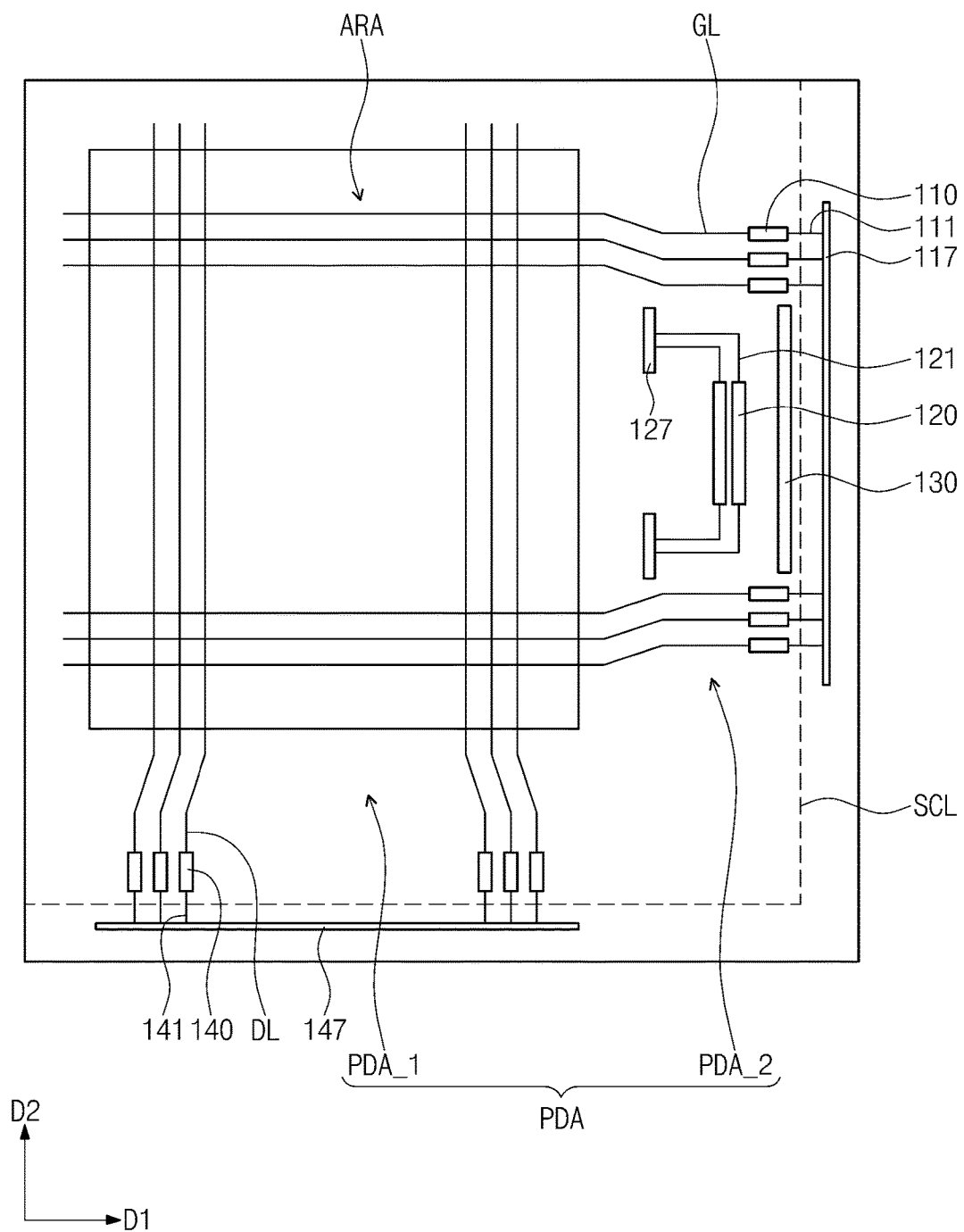
Figure 4C:
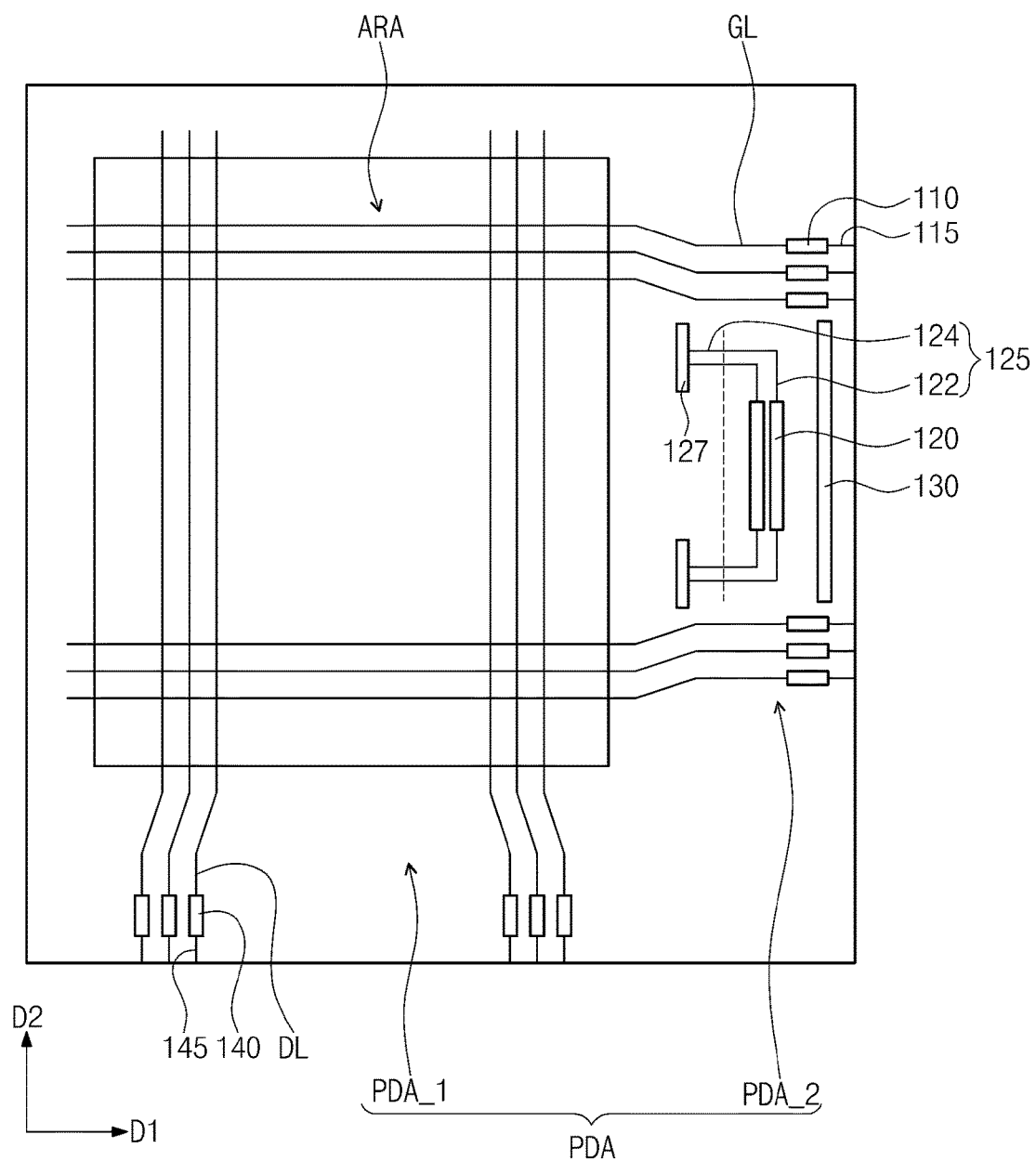

FIGS. 4A through 4C are plan views showing an exemplary embodiment of a manufacturing method of a display device according to the invention.

Referring to FIG. 4A, the gate lines GL, the gate line pads 110, preliminary first shorting bar lines 111, a first shorting bar 117, the floating patterns 120, preliminary second shorting bar lines 121, the second shorting bar 127, the data lines DL, the data line pads 140, preliminary third shorting bar lines 141, a third shorting bar 147 and the outermost line 130 of the first display substrate 100 are formed, such as on the base substrate of a preliminary first display substrate (e.g., the first display substrate 100 in a preliminary or non-final form).

The first display substrate 100 includes the array area ARA and the pad area PDA. The array area ARA and the pad area PDA may be defined on the base substrate within the first display substrate 100. The gate lines GL elongated to extend in the first direction D1 and the data lines DL elongated to extend in the second direction D2 substantially vertical to the first direction D1 of the first display substrate 100 are defined in the array area ARA. The gate and data lines GL and DL may be formed on the base substrate of the first display substrate 100.

Thin film transistors are formed in pixel areas defined in the first display substrate 100. The thin film transistors may be formed on the base substrate within the first display substrate 100. The pixel areas may be defined in association with the gate lines GL and the data lines DL, but the invention is not limited thereto.

In an exemplary embodiment, the thin film transistors, the gate lines GL and the data lines DL may be formed as follows. Among the thin film transistors, the gate lines GL and the data lines DL, a gate line GL and a gate electrode of a thin film transistor are formed on the base substrate of the first display substrate 100. The gate electrode is branched from the gate line GL. For the thin film transistor, a gate insulating layer, an active pattern, a source electrode and a drain electrode are formed above the gate electrode. When the source and drain electrodes are formed, the data line DL is formed. The source electrode is branched from the data line DL.

Referring again to FIG. 4A, the pad area PDA includes the first area PDA_1 expanded in the second direction D2 from the array area ARA and the second area PDA_2 expanded in the first direction D1 from the array area ARA. In addition, a scribe line SCL is defined in the pad area PDA. The scribe line SCL is used as a cutting line in a process of separating portions of the first display substrate 100 from each other. The scribe line SCL defined in the preliminary first display substrate may be defined at outermost edges of a formed first display substrate 100.

The gate line pads 110, the first shorting bar 117, the preliminary first shorting bar lines 111, the floating patterns 120, the second shorting bar 127, the preliminary second shorting bar lines 121 and the outermost line 130 are formed in the second area PDA_2 of the pad area PDA.

The gate line pads 110 are formed between the array area ARA and the scribe line SCL and are electrically connected to distal ends of the gate lines GL. The first shorting bar 117 is formed between the scribe line SCL and an outermost edge of the first display substrate 100 and is electrically connected to the gate line pads 110 by the preliminary first shorting bar lines 111.

The floating patterns 120 are formed between the array area ARA and the scribe line SCL to be adjacent to the gate line pads 110. The second shorting bar 127 is formed between the array area ARA and the scribe line SCL and is electrically connected to the floating patterns 120 by the preliminary second shorting bar lines 121. The outermost line 130 is formed between the scribe line SCL and the floating patterns 120 to be adjacent to the floating patterns 120.

The data line pads 140, the third shorting bar 147 and the preliminary third shorting bar lines 141 are formed in the first area PDA_1 of the pad area PDA. The data line pads 140 are formed between the array area ARA and the scribe line SCL and are electrically connected to distal ends of the data lines DL. The third shorting bar 147 is formed between the scribe line SCL and the outermost edge of the first display substrate 100 and is electrically connected to the data line pads 140.

The order of forming the gate lines GL, the gate line pads 110, the preliminary first shorting bar lines 111, the first shorting bar 117, the floating patterns 120, the preliminary second shorting bar lines 121, the second shorting bar 127, the data lines DL, the data line pads 140, the preliminary third shorting bar lines 141, the third shorting bar 147 and the outermost line 130 of the first display substrate 100 is varied depending on devices and structures. Therefore, the order of forming the above-mentioned devices should not be limited to a specific order.

Referring to FIG. 4B, a physical cutting process, e.g., a sawing process, is performed along the scribe line SCL defined within the preliminary first display substrate to remove the first and third shorting bars 117 and 147 from a remainder of the preliminary first display substrate.

The preliminary first shorting bar lines 111 are cut along the scribe line SCL by the cutting process to remove distal end portions of the preliminary first shorting bar lines 111, and thus the first shorting bar lines 115, each having an end portion at a position corresponding to the scribe line SCL, are formed from a remaining portion of the preliminary first shorting bar lines 111. Similarly, the preliminary third shorting bar lines 141 are cut along the scribe line SCL by the cutting process to remove distal end portion so of the preliminary third shorting bar lines 141, so that the third shorting bar lines 145, each having an end portion at a position corresponding to the scribe line SCL, are formed from a remaining portion of the preliminary third shorting bar lines 141.

To check whether the gate lines GL and the data lines DL are normally operated or not (e.g., whether a defect exists therein), a process of applying a predetermined voltage to the first and third shorting bars 117 and 147 may be further performed before the sawing process is performed on the preliminary first display substrate.

Referring to FIG. 4C, an intermediate portion of the preliminary second shorting bar lines 121 (indicated by a dotted line) is cut such as by a laser trimming process to electrically separate the floating patterns 120 from the second shorting bar 127.

When each of the preliminary second shorting bar lines 121 is cut by the laser trimming process, the second shorting bar line 125 including the first and second lines 122 and 124 separated from each other, is formed from the preliminary second shorting bar lines 121.

As shown in FIG. 2B, when the preliminary second shorting bar lines 121 are cut such as by the laser trimming process along the second direction D2, the first line 122 portion of the preliminary second shorting bar lines 121 has a bent structure. The second line 124 portion of the preliminary second shorting bar lines 121 has an elongated structure without being bent.

As shown in FIG. 3B, when the preliminary second shorting bar lines 121 are cut by the laser trimming process along the first direction D1, the second line 124 portion of the preliminary second shorting bar lines 121 has a bent structure. The first line 122 portion of the preliminary second shorting bar lines 121 has an elongated structure without being bent.

The second shorting bar line 125 may have various structures according to the direction along which the laser trimming process is performed, and the structure of the second shorting bar line 125 should not be limited to a specific structure.

According to the illustrated exemplary embodiment, the intermediate portion of the preliminary second shorting bar lines 121 is laser-trimmed to electrically separate the second shorting bar 127 from the floating patterns 120. In detail, the laser trimming process is performed at the intermediate portion of the preliminary second shorting bar lines 121. Since the preliminary second shorting bar lines 121 are disposed between the floating pattern 120 and the array area ARA, the laser trimming process is irregularly performed. When the preliminary second shorting bar lines 121 are cut by the laser trimming process, the second shorting bar lines 125, each being divided into the first line 122 connected to the floating pattern 120 and the second line 124 connected to the third shorting bar 147, are formed. As described above, since the preliminary second shorting bar lines 121 are cut by the laser trimming process, the first line 122 has a cross-sectional structure corresponding to that of the second line 124 as each being portions of the preliminary second shorting bar lines 121.

Before the preliminary second shorting bar lines 121 are cut by the laser trimming process, the second shorting bar 127 electrically connected to the floating pattern 120 performs a function of discharging static electricity generated in the floating pattern 120. The static electricity may be generated during an inspection process and/or a manufacturing process of the display device. In detail, the floating pattern 120 has a size greater than that of the gate line pads 110 or the data line pads 140. Referring to FIG. 4B, for example, planar dimensions of the floating pattern 120 are greater than those of the gate line pads 110 and the data line pads 140. Accordingly, when the static electricity is generated in the pad area PDA, the static electricity exerts relatively great influence on the floating pattern 120. When the static electricity is generated in the floating pattern 120, the second shorting bar 127 is in the equipotential state with the floating pattern 120, and thus a potential difference caused by the static electricity may be reduced.

Figure 5A:
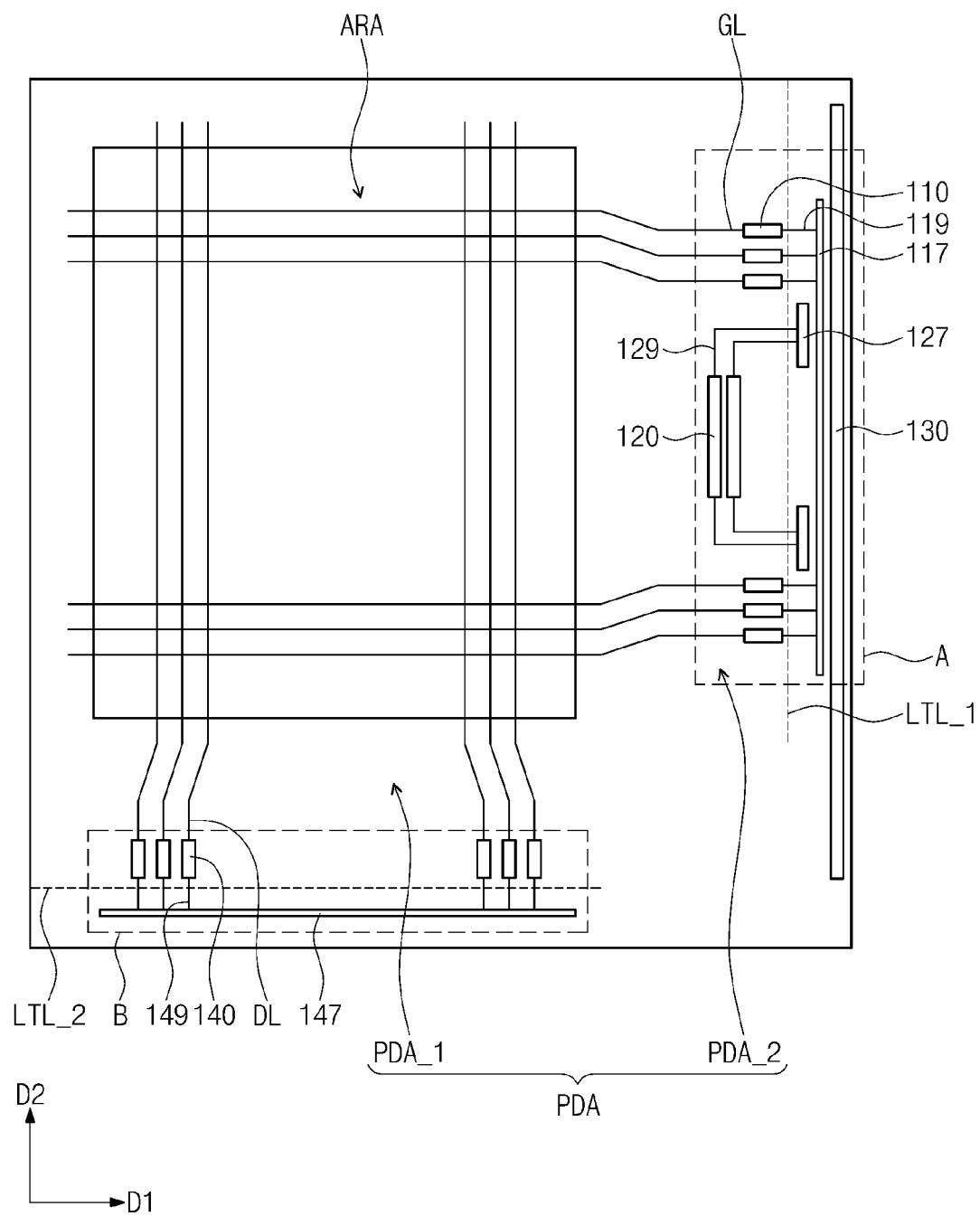
FIG. 5A is a plan view showing still another exemplary embodiment of a first display substrate of a display device according to the invention.
Figure 5B:
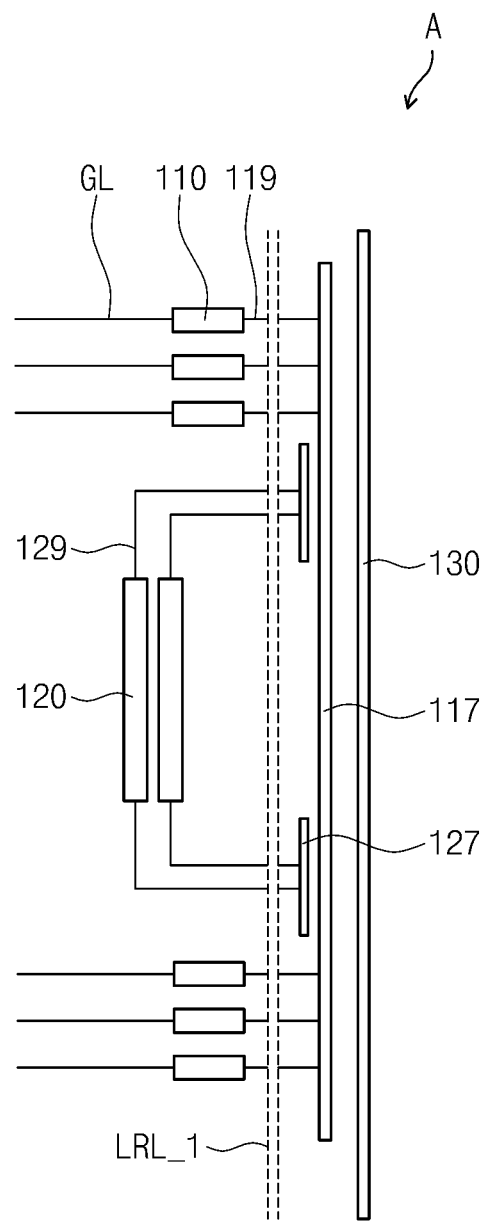
FIG. 5B is a partially enlarged view showing portion A shown in FIG. 5A.
Figure 5B:
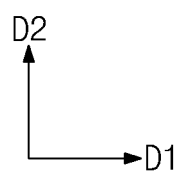
Figure 5C:
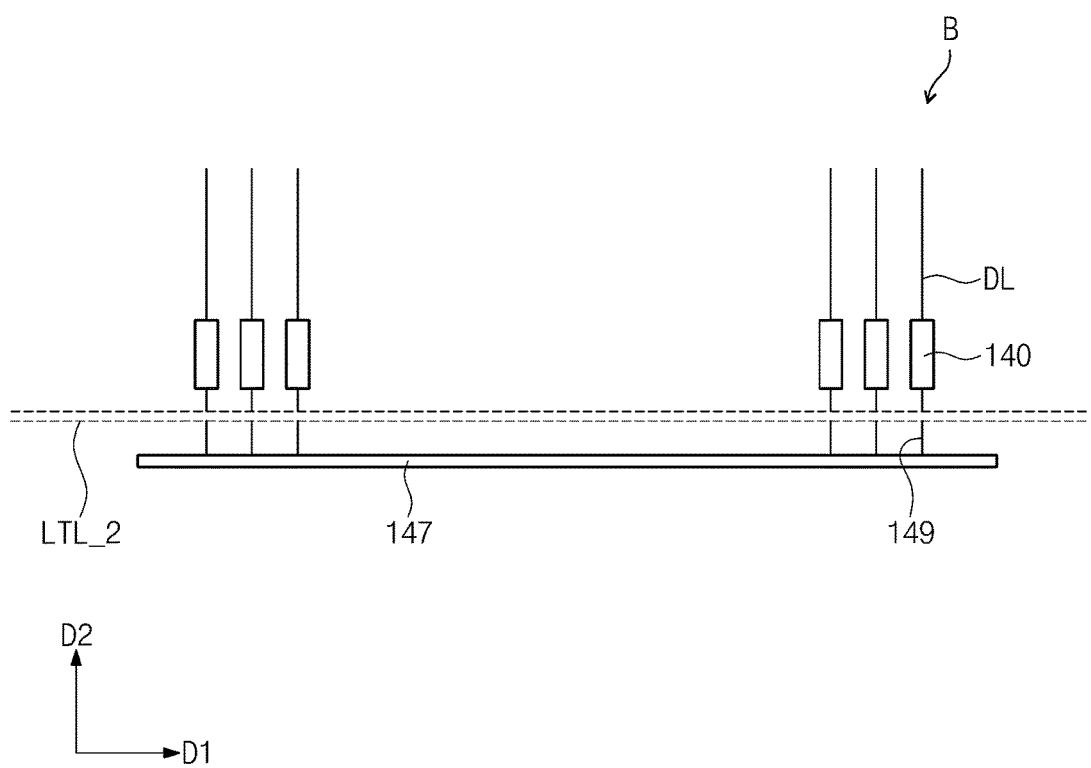
FIG. 5C is a partially enlarged view showing portion B shown in FIG. 5A.

FIG. 5A is a plan view showing another exemplary embodiment of a first display substrate of a display device according to the invention, FIG. 5B is a partially enlarged view showing portion A shown in FIG. 5A, and FIG. 5C is a partially enlarged view showing portion B shown in FIG. 5A. In FIGS. 5A to 5C, the same reference numerals denote the same elements in FIGS. 1 to 4C, and thus detailed descriptions of the same elements will be omitted.

Referring to FIGS. 1 and 5A through 5C, the display device includes a first display substrate 100, a second display substrate 200 spaced apart from the first display substrate 100 and facing the first display substrate 100, and a liquid crystal layer 300 interposed between the first and second display substrates 100 and 200.

The first display substrate 100 includes an array area ARA and a pad area PDA. The first display substrate 100 includes gate lines GL elongated to extend in the first direction D1 and data lines DL elongated to extend in the second direction D2.

Gate line pads 110 electrically connected to the gate lines GL, first shorting bar lines 119, a first shorting bar 117, floating patterns 120, second shorting bar lines 129, a second shorting bar 127, and an outermost line 130 are disposed in the second area PDA_2 of the pad area PDA.

First ends of the gate line pads 110 are connected to distal ends of the gate lines GL and second ends of the gate line pads 110 opposite to the first ends thereof are connected to the first shorting bar lines 119. The first shorting bar lines 119 are disposed between the gate line pads 110 and the first shorting bar 117 and intermediate portions of the first shorting bar lines 119 are cut (indicated by a dotted line in FIGS. 5A and 5B) to divide (e.g., disconnect) collective first shorting bar lines 119 into separate portions thereof. As illustrated in the exemplary embodiment, for example, the first shorting bar lines 119 are elongated to extend in the first direction D1 and are cut along a first cutting line LTL_1 extending in the second direction D2 substantially vertical to the first direction D1. End surfaces of the divided portions for each of the first shorting bar lines 119 which are cut along the first cutting line LTL_1, face each other and correspond to each other. The divided first shorting bar lines 119 do not electrically connect the gate line pads 110 and the first shorting bar 117.

The second shorting bar 127 is disposed between the floating patterns 120 and the first shorting bar 117. The second shorting bar lines 129 are disposed between the floating patterns 120 and the second shorting bar 127 and intermediate portions of the second shorting bar lines 129 are cut (indicated by a dotted line in FIGS. 5A and 5B) to divide (e.g., disconnect) collective second shorting bar lines 129 into separate portions thereof. In the illustrated exemplary embodiment, for example, the second shorting bar lines 129 are cut along the first cutting line LTL_1. A portion of each second shorting bar line 129 is elongated to extend in the first direction D1. That is, the first and second shorting bar lines 119 and 129 are each elongated to extend in the same direction, e.g., the first direction D1, and are cut along the same cutting line, e.g., the first cutting line LTL_1. End surfaces of the divided portions for each of the second shorting bar lines 129 which are cut along the first cutting line LTL_1, face each other and correspond to each other. The divided second shorting bar lines 129 do not electrically connect the floating patterns 120 and the second shorting bar 127.

In the illustrated exemplary embodiment, the outermost line 130 is disposed adjacent to an edge of the first display substrate 100. The outermost line 130 is disposed between the first shorting bar 117 and the edge of the first display substrate 100.

Data line pads 140 electrically connected to the data lines DL, third shorting bar lines 149, and a third shorting bar 147 are disposed in the first area PDA_1 of the pad area PDA.

First ends of the data line pads 140 are connected to distal ends of the data lines DL and second ends of the data line pads 140 opposite to the first ends thereof are connected to the third shorting bar lines 149.

The third shorting bar lines 149 are disposed between the data line pads 140 and the third shorting bar 147 and intermediate portions of the third shorting bar lines 149 are cut (indicated by a dotted line in FIGS. 5A and 5C) to divide (e.g., disconnect) collective third shorting bar lines 149 into separate portions thereof. As illustrated in the exemplary embodiment, for example, the third shorting bar lines 149 are elongated to extend in the second direction D2 and are cut along a second cutting line LTL_2 extending in the first direction D1. End surfaces of the divided portions for each of the third shorting bar lines 149 which are cut along the second cutting line LTL_2, face each other and correspond to each other. The divided third shorting bar lines 149 do not electrically connect the data line pads 140 and the third shorting bar 147.

The first shorting bar 117 disconnected from the gate line pads 110, the divided portions of each of the first shorting bar lines 119, the third shorting bar 147 disconnected from the data line pads 140, and the divided portions of each of the third shorting bar lines 149 may remain in the first display substrate 100, but the invention is not limited thereto.

Figure 6A:
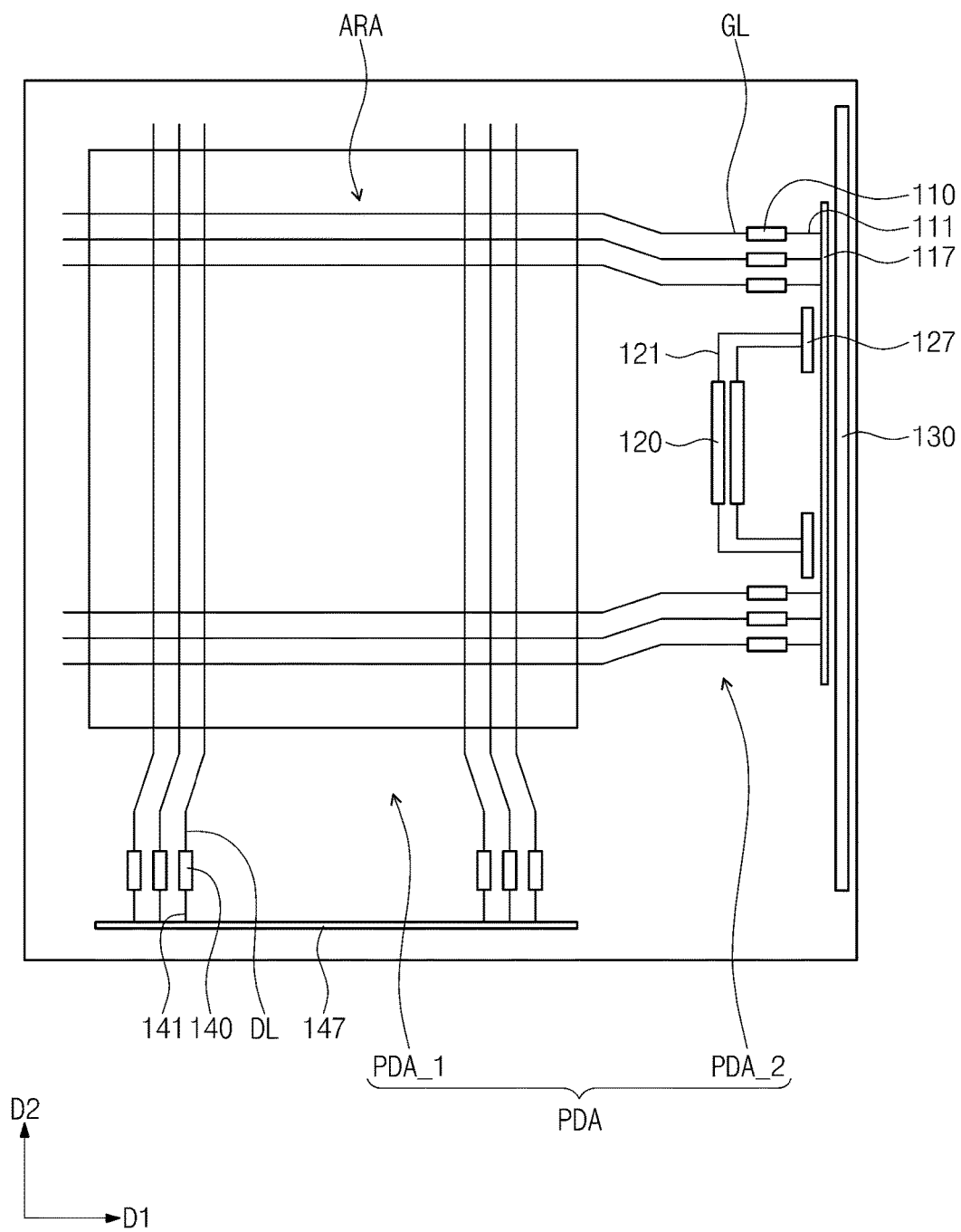
FIGS. 6A and 6B are plan view showing another exemplary embodiment of a manufacturing method of a display device according to the invention.
Figure 6B:
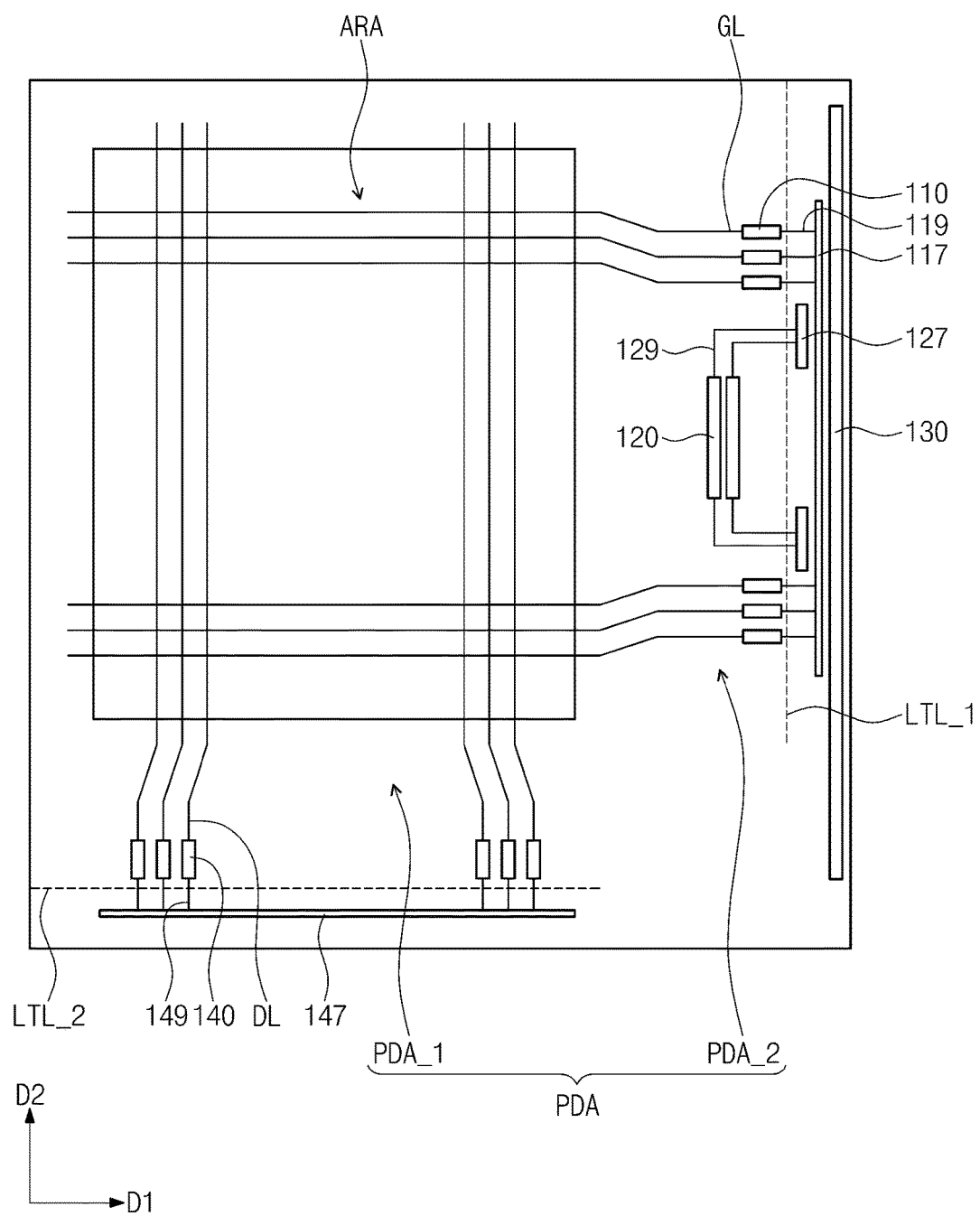

FIGS. 6A and 6B are plan view showing another exemplary embodiment of a manufacturing method of a display device according to the invention.

Referring to FIG. 6A, the gate lines GL, the gate line pads 110, preliminary first shorting bar lines 111, the first shorting bar 117, the floating patterns 120, preliminary second shorting bar lines 121, the second shorting bar 127, the data lines DL, the data line pads 140, preliminary third shorting bar lines 141, the third shorting bar 147, and the outermost line 130 of the first display substrate 100 are formed, such as on a base substrate of a preliminary first display substrate (e.g., the first display substrate 100 in a preliminary or non-final state).

In more detail, the first display substrate 100 includes the array area ARA and the pad area PDA. The array area ARA and the pad area PDA may be defined on the base substrate within the first display substrate 100. The gate lines GL are formed on the first display substrate 100 and are elongated to extend in the first direction D1, and the data lines DL are formed on the first display substrate 100 and are elongated to extend in the second direction D2 substantially perpendicular to the first direction D1.

The pad area PDA includes the first area PDA_1 expanded in the second direction D2 from the array area ARA and the second area PDA_2 expanded in the first direction D1 from the array area ARA.

The gate line pads 110, the first shorting bar 117, the preliminary first shorting bar lines 111, the floating patterns 120, the second shorting bar 127, the preliminary second shorting bar lines 121 and the outermost line are formed in the second area PDA_2 of the pad area PDA.

In the preliminary first display substrate, the gate line pads 110 are electrically connected to the first shorting bar 117 via the preliminary first shorting bar lines 111. The floating patterns 120 are electrically connected to the second shorting bar 127 via the preliminary second shorting bar lines 121. In the illustrated exemplary embodiment, each of the preliminary second shorting bar lines 121 extends from the floating patterns toward the edge of the first display substrate 100 and is bent. The floating patterns 120 are formed between the second shorting bar 127 and the array area ARA. The first and second shorting bars 117 and 127 are formed to be adjacent to each other. The outermost line 130 is formed at an outermost position of the first display substrate 100. In the illustrated exemplary embodiment, for instance, the outermost line 130 is formed between the outermost edge of the first display substrate 100, and the first and second shorting bars 117 and 127.

The data line pads 140, the third shorting bar 147 and the preliminary third shorting bar lines 141 are formed in the first area PDA_1 of the pad area PDA. In the preliminary first display substrate, the data line pads 140 are electrically connected to the third shorting bar 147 via the preliminary third shorting bar lines 141.

The order of forming the gate lines GL, the gate line pads 110, the preliminary first shorting bar lines 111, the first shorting bar 117, the floating patterns 120, the preliminary second shorting bar lines 121, the second shorting bar 127, the data lines DL, the data line pads 140, the preliminary third shorting bar lines 141, the third shorting bar 147 and the outermost line 130 of the first display substrate 100 is varied depending on devices and structures. Therefore, the order of forming the above-mentioned devices should not be limited to a specific order.

Referring to FIG. 6B, the intermediate portions of the preliminary first, second and third shorting bar lines 111, 121 and 141 of the preliminary first display substrate are separated to form first shorting bar lines 119, second shorting bar lines 129 and third shorting bar lines 139 of a first display substrate 100.

The preliminary first and second shorting bar lines 111 and 121 are each elongated to extend in the first direction D1 in the second area PDA_2 of the pad area PDA. Accordingly, when a laser trimming process is performed along the second direction D2 substantially perpendicular to the first direction D1, the intermediate portions of the preliminary first and second shorting bar lines 111 and 121 are cut together with each other at substantially a same time by the laser trimming process to divide the preliminary first and second shorting bar lines 111 and 121 and form the first shorting bar lines 119 and the second shorting bar lines 129 therefrom, respectively. The first shorting bar lines 119 formed by the laser trimming process do not electrically connect the gate line pads 110 and the first shorting bar 117, and the second shorting bar lines 129 formed by the laser trimming process do not electrically connect the floating patterns 120 and the second shorting bar 127.

The preliminary third shorting bar lines 141 are each elongated to extend in the second direction D2 in the first area PDA_1 of the pad area PDA. Therefore, when the laser trimming process is performed along the first direction D1, the intermediate portions of the preliminary third shorting bar lines 141 are cut by the laser trimming process to divide the preliminary third shorting bar lines 141 and form the third shorting bar lines 149 therefrom. The third shorting bar lines 149 formed by the laser trimming process do not electrically connect the data lines pads 140 and the third shorting bar 147.

According to the above, in the preliminary first display substrate, the second shorting bar 127 is electrically connected to the floating patterns 120 via the preliminary second shorting bar lines 121, and thus the static electricity generated in the floating patterns 120 may be discharged. The static electricity may be generated during an inspection process and/or a manufacturing process of the display device. In addition, since in the first display substrate 100, the first shorting bar lines 111 are divided, the floating patterns 120 may be separated from the second shorting bar 127.

Referring to FIG. 6B, the first shorting bar 117 disconnected from the gate line pads 110, the divided portions of each of the first shorting bar lines 119, the third shorting bar 147 disconnected from the data line pads 140, and the divided portions of each of the third shorting bar lines 149 may remain in the first display substrate 100, but the invention is not limited thereto.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
    a substrate comprising an array area in which an image is displayed and a pad area disposed adjacent to the array area;
    gate lines in the array area and elongated in a first direction on the substrate;
    gate lines pads in the pad area and respectively electrically connected to the gate lines;
    floating patterns in the pad area;
    a first shorting bar in the pad area and with which electrostatic energy from the floating patterns is dissipated; and
    first shorting bar lines in the pad area and defined by first lines respectively connected to the floating patterns and second lines spaced apart from the first lines and connected to the first shorting bar, wherein ends of the second lines respectively face ends of the first lines, wherein in the first direction, the first shorting bar is disposed between the array area and the floating patterns.

2. The display device of claim 1, wherein
    the first lines comprise first ends respectively connected to the floating patterns and second ends opposite to the first ends, the second ends of the first lines facing the ends of the second lines, and
    the second ends of the first lines are aligned in a plan view.

3. The display device of claim 1, wherein
    the second lines comprise first ends respectively connected to the first shorting bar and second ends opposite to the first ends, the second ends of the second lines facing the ends of the first lines, and
    the second ends of the second lines are aligned in a plan view.

4. The display device of claim 1, wherein the first lines of the first shorting bar lines have a bent structure.

5. The display device of claim 1, wherein the second lines of the first shorting bar lines have a bent structure.

6. The display device of claim 1, further comprising an outermost line in the pad area.

7. The display device of claim 6, wherein in the first direction, the floating patterns are disposed between the first shorting bar and the outermost line.

8. The display device of claim 1, further comprising second shorting bar lines in the pad area and respectively connected to the gate line pads.

9. The display device of claim 8, wherein distal ends of the second shorting bar lines each terminate at an outermost edge of the substrate.

10. The display device of claim 8, further comprising a second shorting bar in the pad area,
    wherein
    the second shorting bar lines are disposed between the second shorting bar and the gate line pads,
    each of the second shorting bar lines is defined by a first portion connected to a respective gate line pad and a second portion spaced apart from the first portion, wherein the second portion is connected to the second shorting bar, and
    among the second shorting bar lines disposed between the second shorting bar and the gate line pads, ends of the second portions respectively face ends of the first portions.

11. The display device of claim 1, further comprising:
    data lines in the array area and elongated in a second direction substantially crossing the first direction on the substrate;
    data line pads in the pad area and respectively electrically connected to the data lines; and
    second shorting bar lines in the pad area and respectively connected to the data line pads.

12. The display device of claim 11, wherein distal ends of the second shorting bar lines each terminate at an outermost edge of the substrate.

13. The display device of claim 11, further comprising a second shorting bar in the pad area,
    wherein
    the second shorting bar lines are disposed between the second shorting bar and the data line pads,
    each of the second shorting bar lines is defined by a first portion connected to a respective data line pad and a second portion spaced apart from the first portion and connected to the second shorting bar, and
    among the second shorting bar lines disposed between the second shorting bar and the data line pads, ends of the second portions respectively face ends of the first portions.

14. The display device of claim 1, wherein with the ends of the second lines respectively facing the ends of the first lines, the first lines are respectively electrically connected to the floating patterns, and the second lines spaced apart from the first lines are electrically connected to the first shorting bar.

\* \* \* \* \*